Patented Jan. 1, 1952

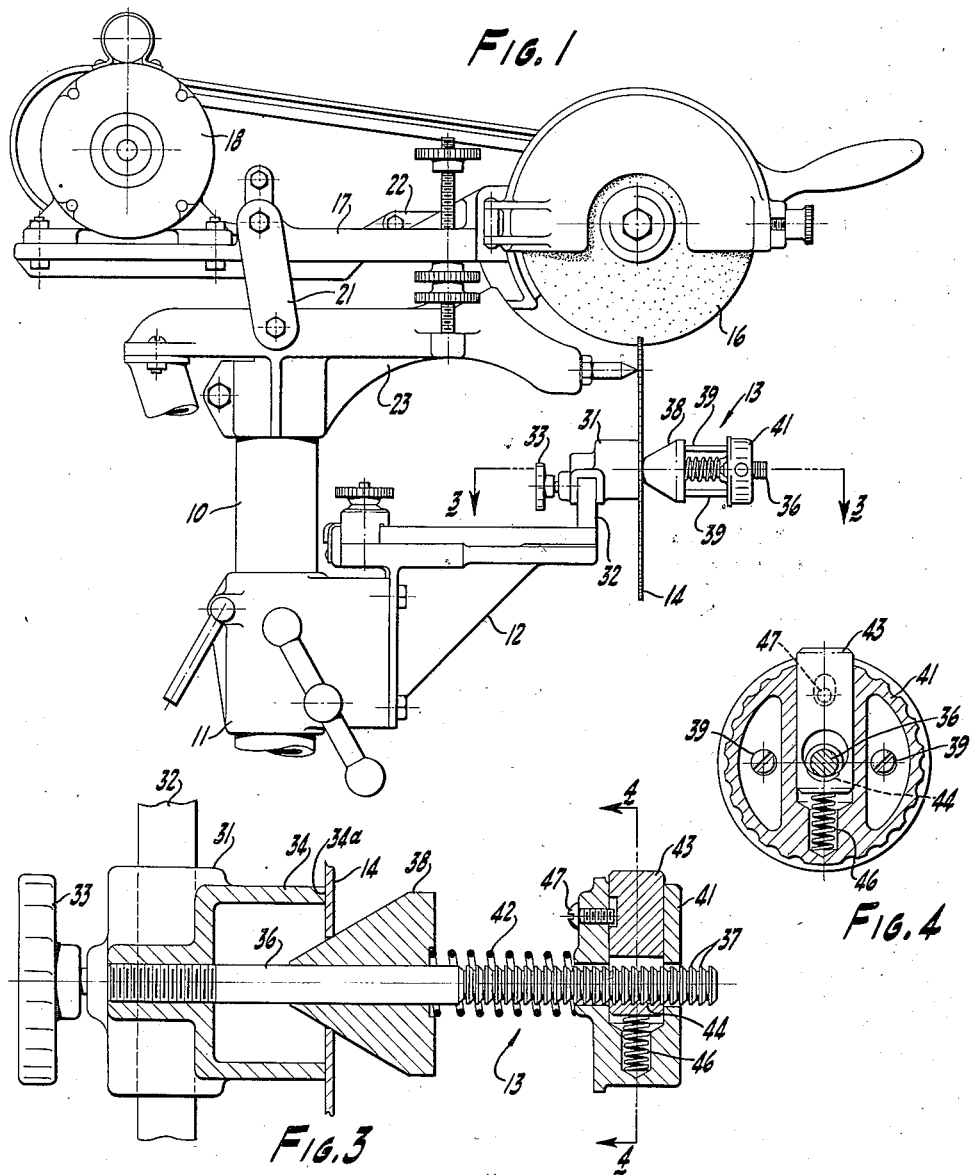
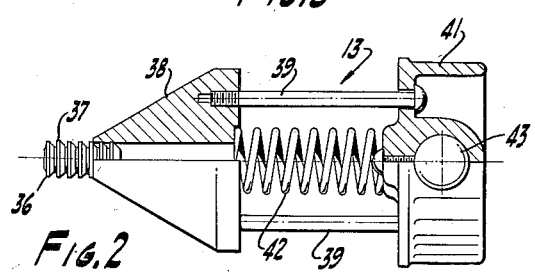

2,580,812

UNITED STATES PATENT OFFICE 2,580,812

SAW HOLDER

James McEwan, San Jose, Calif.

Application December 23, 1947, Serial No. 793,357

1 Claim. (Cl. 76—79)

The present invention relates to saw holders and is concerned more particularly with the provision of a holder or clamp for circular saws and similar devices which can be quickly installed and removed.

It is a general object of the invention to provide a fast acting holder for devices such as saws.

Another object of the invention is to provide a saw holder in which the clamping structure can be moved immediately to clamping position with respect to the saw and releasably latched in clamping position.

A further object of the invention is to provide a holder of the above character having a ratchet type fastening which provides for relative rotation of the parts of the ratchet connection.

A further object of the invention is to provide a saw holder of the fast acting ratchet type in which the conical saw clamping element moves with the saw during its rotative adjustment.

Other objects and advantages of the invention will be apparent from the following description of a preferred embodiment thereof, as illustrated in the accompanying drawings, in which:

Figure 1 is a side elevational view of the upper portion of a saw sharpener employing the saw holder of the instant invention.

Figure 2 is an enlarged elevational view, partially in section, of the clamping structure of the saw holder.

Figure 3 is a horizontal sectional view of the saw holder taken as indicated by the line 3—3 in Figure 1.

Figure 4 is a detail sectional view of the clamping structure taken as indicated by the line 4—4 in Figure 3.

Referring to Figure 1, there is illustrated a saw sharpener including a supporting post 10 on which there is adjustably mounted a support casting 11 for an adjustable bracket 12 on which the saw holder 13 is mounted with the saw 14 shown in place thereon. The saw sharpener as illustrated also includes a sharpening wheel 16 carried by a bracket 17 on which its drive motor 18 is also mounted. The bracket 17 is supported and connected by respective links 21 and 22 on a dust chute 23 at the top of the post 10. The saw sharpener is of the construction described and claimed in my copending application Serial No. 779,001, filed October 10, 1947, for a Saw Sharpener.

Referring to the saw holder in detail, the holder includes a support or abutment device 31 of cast construction which is grooved to slide on a bar 32 of the bracket 12 and is secured in adjusted position thereon by a screw 33. The support device 31 includes a recessed cylindrical portion 34 providing an abutment or face 34a for engagement by the saw 14. Centrally of the recessed portion 34 the device 31 carries a support shaft 36 threaded into a boss thereof, and at its outer end the support shaft 36 is provided with a series of annular ratchet teeth 37.

To hold the saw against the clamping face or abutment 34a, the clamping structure includes a saw engaging cone 38 slidably and rotatably mounted on the shaft 36 in free detachable fashion. The cone 38 carries a pair of connecting bolts 39 slidably secured in a recessed securing element or collar 41 which is also slidable and rotatable with respect to the shaft 36. The bolts 39 limit relative outward movement between the cone 38 and the collar 41 while permitting adjustment of the parts toward each other. A spring 42 is interposed between the cone 38 and the collar 41 to urge them apart and to urge the cone 38 and the saw 14 thereon toward the abutment 34a. The collar 41 is provided with a radial recess intersecting its center aperture and receiving a ratchet button 43 apertured to engage over the shaft 36. The button 43 is provided with ratchet teeth 44 for engagement with the ratchet teeth 37 of the support shaft under the influence of a compression spring 46 seated in the collar 41. A pin which may take the form of a screw 47 in the collar 41 engages a suitable slotted recess in the button 43 to maintain the button within the collar 41.

As shown in Figure 3, the ratchet teeth 44 of the securing element are engaged with the ratchet teeth 37 of the shaft 36 so that the cone 38 is urged by the spring 42 to engage in the central hole of the saw 14 and to clamp the saw against the abutment 34a. To release the saw and remove the clamping structure, the button 43 is depressed to free the teeth 44 from the teeth 37 so that the entire clamping structure can be freely withdrawn as a unit from the shaft 36. If additional spring pressure is desired in holding the saw 14 in place, the securing collar 41 is moved to the left as viewed in Figure 3 on the shaft 36 so that it will be secured in a more adjacent position to the cone 38 and provide additional compression of the spring 42.

It will be noted that, by virtue of the rotative connection between the ratchet teeth 37 of the shaft 36 and the teeth 44 of the latch button 43, as the saw 14 is rotated to adjust its position with respect to the sharpening device the clamping structure including the cone 38 can rotate with it so that no wear is caused between the sharp edge of the saw and the cone 38. Also, the clamping structure can be freely engaged and disengaged from the shaft 36 without reference to any special rotative positioning thereof, enabling fast installation and removal of saws from the sharpener.

While I have shown a preferred embodiment of the invention, it will be understood that the invention is capable of variation and modification from the form shown so that its scope should be limited only by the scope of the claim appended hereto.

I claim:

In a saw holder; an abutment device having an annular face; a shaft extending outwardly from said abutment device and disposed in axial alignment with said annular face; said abutment device having a groove disposed in a plane approximately parallel to said face and crossing said shaft to engage and enable the abutment device to be moved along a bar; a screw element on the abutment device extending into said groove and operable to clamp the abutment device to said bar, the longitudinal axis of said screw-element and said shaft being substantially in parallelism; a series of annular ratchet teeth on said shaft; a saw clamping cone slidably and rotatably mounted on said shaft for engaging a saw and holding it against said abutment device in centered relation with respect to said shaft; a ratchet collar member slidably and rotatably mounted on said shaft; a button member mounted transversely in said collar having an apertured portion with internal ratchet teeth for engagement with the ratchet teeth of said shaft; a spring engaged with said button member in a direction to maintain engagement of said teeth and to maintain the outer end of said button member projected beyond the periphery of the collar member in position for pushing movement to disengage said teeth; means slidably connecting said collar member and said cone for relative longitudinal movement and simultaneous rotating movement; a spring interposed between said cone and said collar member; the last-mentioned means, said collar member, said button member, said cone, and said springs forming a quick detachable clamping unit; one of said members having a recess; and the other member having a pin extending into said recess to hold said button member against detachment from said collar member to prevent their separation when the unit is detached from said shaft.

JAMES McEWAN.

REFERENCES CITED

The following references are of record in the file of this patent:

UNITED STATES PATENTS

| Number | Name | Date |
| --- | --- | --- |
| 857,007 | Markmann | June 11, 1907 |
| 924,122 | Williams | June 8, 1909 |
| 1,020,322 | Sorenson | Mar. 12, 1912 |
| 1,966,364 | Thrasher | July 10, 1934 |
| 2,463,007 | Wheeler | Mar. 1, 1949 |